US 6,673,462 B2

(12) United States Patent
Nakashima et al.

(10) Patent No.: US 6,673,462 B2
(45) Date of Patent: Jan. 6, 2004

(54) FREQUENCY SELECTIVE PLATE AND METHOD FOR PRODUCING SAME

(75) Inventors: Hiroshi Nakashima, Mie (JP); Motoh Asakura, Mie (JP); Masaaki Yonekura, Mie (JP); Hideo Omoto, Mie (JP)

(73) Assignee: Central Glass Company, Limited, Ube (JP)

( * ) Notice: Subject to any disclaimer, the term of this patent is extended or adjusted under 35 U.S.C. 154(b) by 0 days.

(21) Appl. No.: 10/128,516

(22) Filed: Apr. 24, 2002

(65) Prior Publication Data
US 2003/0039842 A1 Feb. 27, 2003

(30) Foreign Application Priority Data

Apr. 27, 2001 (JP) ........................................ 2001-132236
Mar. 6, 2002 (JP) ........................................ 2002-060205

(51) Int. Cl.[7] .............................. B32B 9/00; B32B 17/06
(52) U.S. Cl. ..................... 428/469; 428/546; 428/472.2; 428/698; 428/432; 428/323; 428/332; 428/402; 428/433; 428/689; 428/699; 204/192.11; 204/192.1; 204/157.22
(58) Field of Search ................................ 428/469, 546, 428/472.2, 698, 432, 323, 328, 332, 402, 433, 689, 699; 204/192.11, 191.1, 157.22

(56) References Cited

U.S. PATENT DOCUMENTS 6,395,398 B1    5/2002    Nakashima et al.

2002/0142149 A1  *  10/2002  Nakashima et al.

FOREIGN PATENT DOCUMENTS

| JP | 02-160641 | * | 6/1990 | .......... C03C/17/36 |
| JP | 04-144930 | * | 5/1992 | .......... C03B/11/00 |
| JP | 2620456 |   | 3/1997 | |
| JP | 2000-281388 |   | 10/2000 | |
| JP | 2000-344547 |   | 12/2000 | |
| JP | 2000-344548 |   | 12/2000 | |
| JP | 2001-26071 |   | 1/2001 | |

OTHER PUBLICATIONS

"What a difference a layer makes" Precision, Nov. 2001, Ruske et al.*
US 20020142149 A1 Oct. 2002 Nakashima et al. C23C14/00.*
Nakashima et al., "Application of Silver–Dispersed AlN Thin Film to Solar Control Glass", Journal of Applied Physics, vol. 84, No. 11, pp. 6285–6290 (Dec. 1998).
European Search Report (European Patent Office), EP 02 009575 date (Sep. 2, 2002).

* cited by examiner

Primary Examiner—Robert R. Koehler
Assistant Examiner—Vivek Koppikar
(74) Attorney, Agent, or Firm—Crowell & Moring LLP

(57) ABSTRACT

The invention relates to a frequency selective plate having a radio wave transparent property. This frequency selective plate includes (a) a transparent substrate; (b) a mixture layer formed on the transparent substrate, the mixture layer containing a mixture of a metal nitride and Ag; and (c) Ag particles formed on the mixture layer, the Ag particles being two-dimensionally distributed on the mixture layer and being separated from each other.

12 Claims, 2 Drawing Sheets

FREQUENCY SELECTIVE PLATE AND METHOD FOR PRODUCING SAME

BACKGROUND OF THE INVENTION

The present invention relates to a frequency selective plate that performs high transparency of radio waves and visible rays while reflecting heat rays of solar radiation to provide sufficient heat insulation. This frequency selective plate can be used for architectural and automotive window glasses.

Lately, a windowpane coated with a conductive thin layer or covered with a film including a conductive thin layer has been practically used for the purpose of shielding solar radiation. If such a windowpane is applied to multistoried buildings, the windowpane reflects radio waves of TV frequency range to generate ghost image in TV screen and to degrade receiving satellite broadcasting waves through indoor antenna. Further, if such a windowpane is applied to architectural and automotive windows, this functions to degrade the performance of cellular phones and the gain of an antenna embedded in the window pane. In order to solve these problems, a glass plate coated with a heat-reflecting film is employed to transmit part of visible rays and to decrease the reflection of radio waves. This heat-reflecting film is required to be relatively high in electrical resistance and to be transparent.

Further, Japanese Patent No. 2620456 discloses a method for preventing a radio wave trouble by dividing a length of a conductive film parallel to a field direction of incident radio waves into 1/20 the wavelength of the radio wave. However, the former method employing the high-transparent heat-reflecting film may not be sufficient in heat-ray shielding performance, although a glass plate made by the former method prevents the radio wave trouble by decreasing the reflection of radio waves. Further, a glass plate made by the latter method disclosed in Japanese Patent No. 2620456 reflects visible rays and near-infrared rays, since the divided length of the film is greater than the wavelength of the visible ray and near-infrared ray. Therefore, although this glass plate ensures a frequency selective performance having a radio wave transmitting performance and a solar radiation shielding performance, this may not ensure the transparency of visible rays. Additionally, in case of a large window employing a large-size glass plate such as one having 2 m×3 m size, it is necessary to take a very long time for cutting a dielectric film into segments of 1/20 satellite broadcasting wavelength of about 25 mm by means of a yttrium-aluminum-garnet (YAG) laser.

Each of Japanese Patent Publications JP-A-2000-281388 and JP-A-2000-344547 discloses a frequency selective plate having a radio wave transparent property. This plate is prepared by the steps of (a) forming an Ag continuous layer on a glass substrate surface; and (b) subjecting the coated glass substrate to a heat treatment, thereby changing the Ag continuous layer to Ag particles. Prior to the step (a), an AlN layer is optionally formed on the glass substrate surface.

Journal of Applied Physics Vol. 84, No. 11, pages 6285–6290 (1998) discloses a silver particle-dispersed AlN film fabricated by heating a film consisting of three layers of AlN, Ag, and AlN.

SUMMARY OF THE INVENTION

It is an object of the present invention to provide an improved frequency selective plate having a radio wave transparency.

It is a more specific object of the present invention to provide a frequency selective plate which decreases reflectance of radio waves of particular frequency bands for TV broadcast, satellite broadcast and cellular phone while ensuring solar radiation shielding performance and visual light rays transparency.

According to the present invention, there is provided a frequency selective plate having a radio wave transparent property. This frequency selective plate may be referred to hereinafter as the first frequency selective plate and comprises:

a transparent substrate;

a mixture layer formed on said transparent substrate, said mixture layer comprising a mixture of a metal nitride and Ag; and Ag particles formed on said mixture layer, said Ag particles being two-dimensionally distributed on said mixture layer and being separated from each other.

According to the present invention, there is provided a first method for producing the frequency selective plate. The first method comprises the steps of:

(a) forming a precursory layer on said transparent substrate, said precursory layer comprising a precursory mixture of said metal nitride and said Ag; and (b) heating said precursory layer into said mixture layer such that said Ag particles, which originate from said Ag of said precursory layer, are formed on said mixture layer.

According to the present invention, there is provided a second method for producing a frequency selective plate having a radio wave transparent property. The second method comprises the steps of:

(a) forming a first precursory layer on a transparent substrate, said first precursory layer comprising a mixture of a metal nitride and Ag;

(b) forming a second precursory layer on said first precursory layer, said second precursory layer comprising Ag; and (c) heating said first and second precursory layers into a mixture layer comprising said metal nitride and said Ag such that Ag particles, which originate from said Ag of at least one of said first and second precursory layers, are formed on said mixture layer.

The frequency selective plate produced by the second method may be the same as that produced by the first method. In this case, the mixture layer (originating from the first and second precursory layers) produced by the second method can be the same as the mixture layer (originating from the precursory layer) produced by the first method. Alternatively, the frequency selective plate produced by the second method may be different from that produced by the first method. In this case, the mixture layer produced by the second method can have two layers, that is, first and second mixture layers respectively originating from the first and second precursory layers.

DESCRIPTION OF THE PREFERRED EMBODIMENTS

Figure 1:
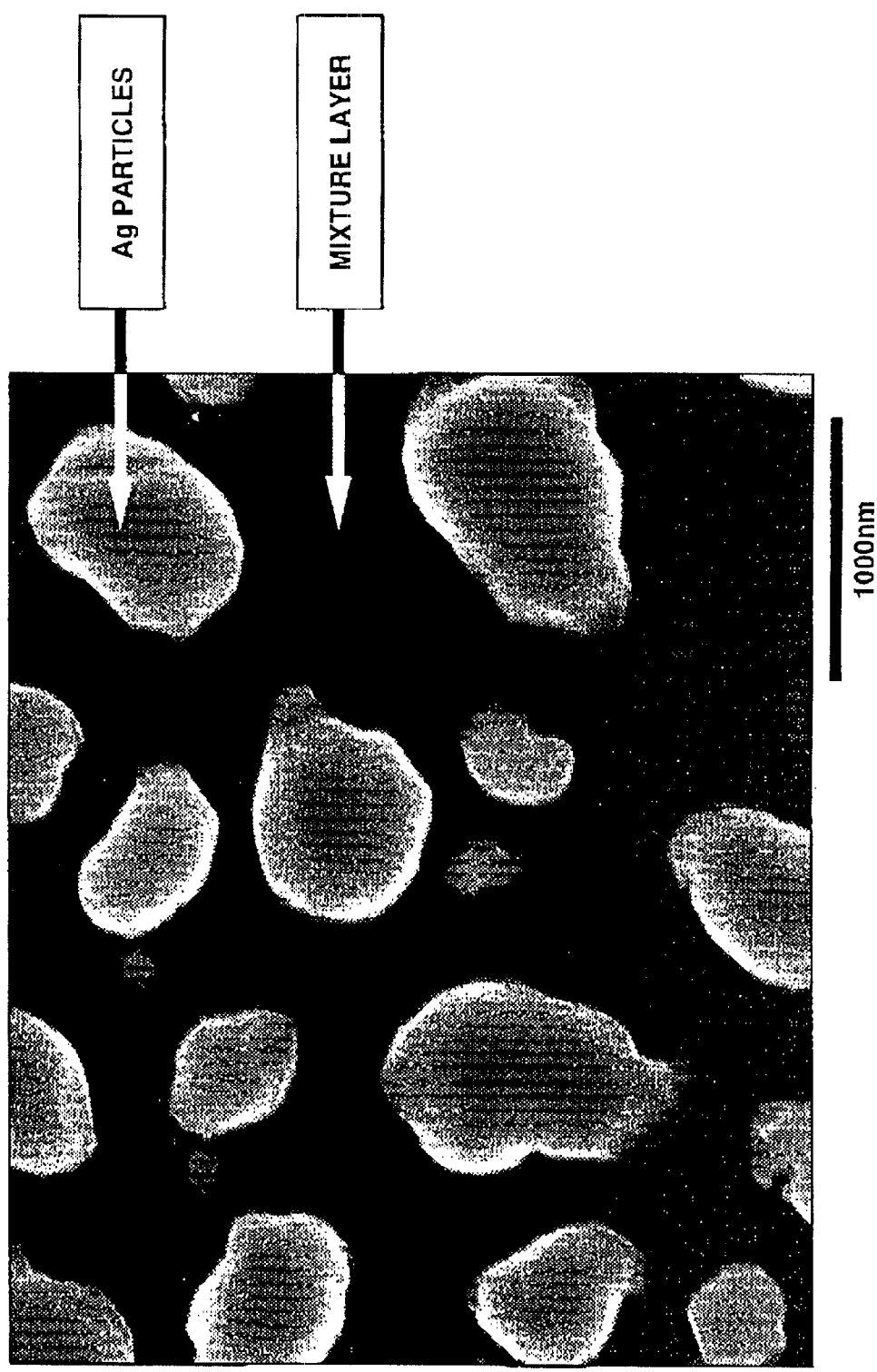
FIG. 1 is a photograph taken by a scanning electron microscope (SEM) from above in a direction along normal line of the frequency selective plate obtained in Example 6.

The inventors unexpectedly found that the above-mentioned first method, which is much simpler than those of JP-A-2000-281388 and JP-A-2000-344547, can produce a good frequency selective plate having a radio wave transparent property, as will be clarified hereinafter.

The inventors further unexpectedly found that the above-mentioned second method can produce a good frequency selective plate that is superior in visible light rays transparency and heat insulation, as will be clarified hereinafter.

As stated above, a frequency selective plate according to the present invention has at least (a) a transparent substrate; (b) a mixture layer (containing a mixture of a metal nitride and Ag) formed on the transparent substrate; and (c) Ag particles formed on the mixture layer. The Ag particles are two-dimensionally distributed on the mixture layer and are separated from each other. The mixture layer may have two layers, that is, first and second mixture layers each containing a mixture of a metal nitride and Ag. In this case, the Ag particles are formed on the second mixture layer.

The frequency selective plate can be produced by the first method comprising the steps of:

(a) forming a precursory layer on the transparent substrate, the precursory layer comprising a precursory mixture of the metal nitride and the Ag; and (b) heating the precursory layer into the mixture layer such that the Ag particles, which originate from the Ag of the precursory layer, are formed on the mixture layer.

The metal nitride of the mixture layer may be at least one nitride of at least one metal that can be selected from Al, Si, Ti, Ta, Ge, In, W, V, Mn, Cr, Ni, and stainless steel. Of these, it may be selected from Al, Si, Ti, and Ta.

The mixture layer can have a structure of a three-dimensional skeleton of the metal nitride and the Ag in the form of clusters. The Ag clusters are separately and three-dimensionally distributed in the three-dimensional skeleton of the metal nitride. Each Ag cluster is an aggregate of Ag atoms and has a size much smaller than that of each Ag particle on the mixture layer. It is assumed that one Ag cluster is an aggregate of Ag atoms of 5–25 in number and has a particle size of about 1 nm. It is possible in sputtering to eject metal atoms in the form of such clusters from the metal target by argon ions, and sputtering can provide the three-dimensional skeleton of the metal nitride.

The mechanism of the formation of Ag particles on the mixture layer can be explained as follows. In the step (b), the Ag clusters, which are three-dimensionally distributed in the three-dimensional skeleton of the metal nitride in the precursory layer, diffuse to the exposed surface of the precursory layer by receiving heat energy. This diffusion may form minute void spaces in the mixture layer to make it have a porous structure. By conducting the heating for a longer time, the Ag content of the mixture layer becomes less. As the diffusion proceeds, many Ag clusters nucleate on the precursory layer to form Ag nuclei. The Ag nuclei further grow into the Ag particles during the heating. In other words, the Ag particles are formed, and at the same time the precursory layer is gradually changed into the mixture layer. The Ag particles may have a minimum particle size of from 100 nm to 500 nm and an average particle size of from 100 nm to 0.5 mm. It is possible to make all or most of the Ag clusters to diffuse to the surface of the precursory layer by conducting the step (b) for a very long time. This makes it possible to increase the number of the Ag particles on the mixture layer and to reduce the Ag clusters remaining in the mixture layer.

The frequency selective plate may have a dielectric layer that is disposed between the transparent substrate and the mixture layer. Alternatively, this dielectric layer may be formed on the mixture layer such that the Ag particles are embedded in the dielectric layer. In this case, the bottom surfaces of the Ag particles border on the boundary between the mixture layer and the dielectric layer. The resulting dielectric layer may serve as a protective film of the frequency selective plate.

The dielectric layer may be made a material that is a nitride of one selected from Al, Si, Ti, Ta, Ge, In, W, V, Mn, Cr, Ni, and stainless steel, or an oxide of one selected from Al, Si, Zn, Sn, Ti, Ta, Ge, In, W, V, Mn, Cr, Ni, and stainless steel. Furthermore, the dielectric layer may have a multilayer structure made of at least two of these materials. In particular, it is preferable to use a nitride of Al or Si, or an oxide of one selected from Al, Si, Zn, Sn, Ti, Ta and In for architectural and automotive windowpanes, which require high visible light transmittance, since these nitrides and oxides are colorless and transparent. These nitrides and oxides are also preferably used in a case that first and second dielectric layers are respectively formed on the transparent substrate and on the mixture layer to increase the visible light transmittance. These dielectric layers may have a multilayer structure, too.

If the particle size is greater than or equal to $1/20$ of the shortest wavelength of commonly used satellite broadcasting waves, radio wave interference noise may become a problem. Therefore, it is preferable that the particle size of the Ag particles is 0.5 mm or less.

In the preparation of the frequency selective plate, a volume ratio (Vag) of the Ag of the precursory layer to the total of the Ag of the precursory layer and the metal nitride of the precursory layer may be 0.5 or less. This volume ratio (Vag) is defined by the following expression (2):

$$Vag = \frac{(Wag/\rho ag)}{(Wag/\rho ag) + (Wn/\rho n)} \quad (2)$$

where Wag is a weight of the Ag of the precursory layer formed per 1 m² of the transparent substrate; Wn is a weight of the metal nitride of the precursory layer formed per 1 m² of the transparent substrate; ρ ag is a bulk density of the Ag of the precursory layer, the bulk density having a unit of kg/m³; and ρ n is a bulk density of the metal nitride, the bulk density having a unit of kg/m³. As the volume ratio (Vag) becomes greater, the average particle size of the Ag particles becomes larger. If it exceeds 0.5, the formation of the Ag particles may become difficult since a part of the Ag may be continuously distributed in the mixture layer.

A frequency selective plate according to the present invention decreases reflectance of radio waves of particular frequency bands for TV broadcast, satellite broadcast and cellular phone while ensuring solar radiation shielding performance and visual light rays transparency. In particular, it is possible by the frequency selective plate to shift resonance wavelength to a range of 800–1,500 nm, in which the value of shielding effect (Es) is large, without reducing reflectance. Therefore, the resulting frequency selective plate is superior in visible light rays transparency and heat insulation. Thus, it can be applied to architectural and automotive windowpanes and the like. In fact, the frequency selective plate can have a visible light transmittance of 15% or greater.

It is possible to obtain a frequency selective plate capable of selectively reflecting near infrared rays by making the Ag particles have an average particle size of 0.5 mm or less and by suitably adjusting the heating conditions and the like.

As stated above, there is provided a second method for producing a frequency selective plate having a radio wave transparent property. The second method comprises the steps of:

(a) forming a first precursory layer on a transparent substrate, the first precursory layer comprising a mixture of a metal nitride and Ag;

(b) forming a second precursory layer on the first precursory layer, the second precursory layer comprising Ag; and (c) heating the first and second precursory layers into a mixture layer comprising the metal nitride and the Ag such that Ag particles, which originate from the Ag of at least one of the first and second precursory layers, are formed on the mixture layer.

The second method will be described in detail in the following. Since the second method is similar to the first method, the same descriptions as those of the first method will be omitted for simplification. It is possible by the second method to produce a first frequency selective plate that is the same as that produced by the first method or a second frequency selective plate. The second frequency selective plate comprises:

a transparent substrate;

a first mixture layer formed on the transparent substrate, the first mixture layer comprising a mixture of a metal nitride and Ag;

a second mixture layer formed on the first mixture layer, the second mixture layer comprising a mixture of a metal nitride and Ag; and Ag particles formed on the second mixture layer, the Ag particles being two-dimensionally distributed on the second mixture layer and being separated from each other. The second frequency selective plate may be identical with the first frequency selective plate except that the former plate has the second mixture layer. Therefore, the same descriptions as those of the above-mentioned frequency selective plate will not be repeated hereinafter.

The second precursory layer may be an Ag continuous layer having a thickness of from 5 nm to 1 $\mu$m. The Ag continuous layer may be provided for the purpose of increasing the particle diameter of the Ag particles formed by the heating. In fact, the Ag continuous layer can be defined as containing Ag at least partly continuously distributed in the Ag continuous layer. In another way, the Ag continuous layer can be defined such that the Ag continuous layer has an Ag concentration that is higher than that of the first precursory layer. When the Ag continuous layer is formed on the first precursory layer, it is possible to form the Ag particles on the mixture layer originating from the first precursory layer. In other words, the Ag continuous layer may turn into the Ag particles. In this case, the resulting frequency selective plate may be identical with that prepared by the first method. A layer of the Ag particles may have a thickness of 10–500 nm.

In an alternative case (i.e., an alternative to the case of forming the Ag continuous layer), the second precursory layer may contain a mixture of Ag and a metal nitride. In this case, the second precursory layer may be identical with the first precursory layer with an exception that the Ag content of the second precursory layer is less than the Ag content of the first precursory layer. With this exception, it becomes easy to control the particle size of the Ag particles. In the alternative case, it is possible to obtain the above-mentioned second frequency selective plate.

The above-mentioned Ag continuous layer may have a thickness of from 5 nm to 1 $\mu$m. If it is less than 5 nm, it may become difficult to form a continuous layer to cover all the surface of the first precursory layer. If it is greater than 1 $\mu$m, it may become difficult to form the Ag particles by conducting the heating at a temperature lower than the softening point of the transparent substrate (glass substrate). It is optional to introduce an additive (e.g., Pt, Pd and Al) in an amount of less than 10% into the Ag continuous layer. With this, it becomes possible to control the particle size and the number of the after-mentioned precursory Ag particles that are precursory products obtained by heating the Ag continuous layer. Furthermore, it becomes possible to prevent deterioration of the Ag continuous layer until the start of the heating. As will be explained in detail hereinafter, the precursory Ag particles grow into the Ag particles by conducting the heating. The metal nitride contained in the first and second precursory layers may be a nitride of a metal selected from Al, Si, Ti, Ta, Ge, In, W, V, Mn, Cr, Ni and stainless steels.

Similar to the first frequency selective plate, the second one may also have at least one dielectric layer that is disposed between the transparent substrate and the first mixture layer and/or is formed on the second mixture layer such that the Ag particles are embedded in the dielectric layer. The dielectric layer of the second frequency selective plate may be identical with the above-mentioned dielectric layer. Therefore, all the above-mentioned descriptions relating to the dielectric layer can be applied to the dielectric layer of the second frequency selective plate.

The method for forming the precursory layer (the first or second precursory layer), or the dielectric layer is not particularly limited. Its examples include sputtering, vacuum deposition, chemical vapor deposition (CVD), and ion plating. For example, Ag can be used as a target material to form the precursory layer or the first or second precursory layer. In particular, DC magnetron sputtering may be chosen in view of uniformity and productivity of the target layer.

The heating of the precursory layer (the first or second precursory layer) can be conducted by resistance heating, gas burning heating, laser beam irradiation, electron beam irradiation, or induction heating. For example, it is possible to conduct the heating by irradiating the precursory layer for a short period of time with a laser beam that is not absorbed by the transparent substrate but by the precursory layer. This can prevent the transparent substrate from heating. Therefore, such irradiation is preferably conducted if a heat resistant, transparent, plastic plate is used as the transparent substrate. It is also preferable to use an induction heating capable of selectively heating conductive materials.

The heating of the precursory layer (the first or second precursory layer) can be conducted at 150° C. or higher. In a case of resistance heating or gas burning heating, it is preferable to conduct the heating for a time of from several seconds to several hours at a temperature at which the transparent substrate does not deteriorate. In a case of laser or electron beam irradiation or induction heating, the maximum heating temperature is boiling point of Ag, 2,212° C. In this case, the heating can be conducted for a time of from one microsecond to several seconds. After the heating, the coated substrate can be cooled down rapidly either naturally or compulsory to fix the Ag concentration gradient or heterogeneity in the mixture layer in a direction along the thickness of the mixture layer.

Plasma frequency of Ag resides in the ultraviolet rays range, and a range called "silver window", where extinction coefficient of Ag becomes infinitesimal, resides in a lower frequency side of the plasma frequency. Therefore, transparency of visible light rays is ensured by controlling the thickness of the Ag particles and the thickness of the dielectric layer.

The shape of the Ag particles is not particularly limited. For example, its shape may be hemispherical, dome-like, of a string of domes, flat, flake-like or needle-like. In view of optical performance, the shape is preferably hemispherical, dome-like, flat or flake-like. It is possible to control the particle size, the number and the distribution of the Ag particles by adjusting the thickness of the Ag continuous layer, the thickness of the mixture layer, and/or the heating conditions. With this, it is possible to obtain a film that selectively reflects near infrared rays.

It is preferable that a shielding effect ($E_s$) of the frequency selective plate in a near infrared region is 0.3 or greater. This shielding effect is defined by the following expression (1), $$E_s = \frac{\sum_{\lambda=680}^{1800}[R_{dp}(\lambda)I_{sr}(\lambda)]}{\sum_{\lambda=680}^{1800}[I_{sr}(\lambda)]}, \quad (1)$$

where $\lambda$ is a wavelength of an electromagnetic wave incident on a coated side of the frequency selective plate, $R_{dp}(\lambda)$ is a reflectance of the coated side of the frequency selective plate at the $\lambda$, and $I_{sr}(\lambda)$ is an intensity of solar radiation at the $\lambda$ when an air-mass is 1.

For the purpose of obtaining a shielding effect (Es) of 0.3 or greater, it is necessary to adjust the particle size of the Ag particles formed on the mixture layer (in the first method) or on the second mixture layer (in the second method) such that the frequency selective plate has a maximum light ray reflectance in a wavelength range of from 600 nm to 1,500 nm. For this purpose, it is preferable that the Ag particles have an average particle size of 100 nm or greater and that a ratio (an areal ratio) of the total area occupied by the Ag particles to the total area of the mixture layer (the second mixture layer) is 0.2 or greater in a plan view (see FIG. 1) of the frequency selective plate. This ratio is preferably 0.8 or less. This ratio can be determined as follows. At first, a plan view of the frequency selective plate is observed by a field emission-type scanning electron microscope (FE-SEM) in a direction along normal line of the frequency selective plate. After that, an image processing of the plan view is conducted by putting a white color on the Ag particles and a black color on the matrix (i.e., the mixture layer surface having thereon no Ag particles). Then, the above ratio is determined by dividing the area of the white color by the total area of the plan view.

If the above areal ratio is less than 0.2, the average distance between adjacent Ag particles may become more than twice the particle size of the Ag particles. With this, mutual interaction among the Ag particles may be insufficient. In other words, the Ag particles are likely to exist singly and independently. Therefore, the light ray reflectance tends to have a value similar to the above areal ratio. Thus, even though the reflectance has the maximum value in a wavelength range of 600–1,500 nm, it may be difficult to get the target shielding effect (Es) in a near infrared region if the above areal ratio is less than 0.2. If the Ag particles have an average particle size of less than 100 nm, the reflectance have the maximum value in a wavelength range of 600 nm or less irrespective of the value of the areal ratio.

The number and the particle size of the Ag particles per 10 $\mu m^2$ can be determined by observing a plan view of the frequency selective plate by FE-SEM, for example, S-4500 (trade name) of Hitachi Ltd., Tokyo, Japan, in a direction along normal line of the frequency selective plate and then by conducting an image processing of the plan view. It is possible to conduct the image processing by putting a white color on the Ag particles and a black color on the matrix (i.e., the surface of the mixture layer or the second mixture layer having thereon no Ag particles), then by measuring the area of each Ag particle (each white color mark) by a computer, then by finding a diameter of each circle identical with the area of each Ag particle, and then by determining the average of the diameters as the average particle size (diameter) of the Ag particles. Therefore, if the Ag particles have a dome-like shape, the particle size is the same as the base diameter.

Examples of the transparent substrate are glass substrate, transparent ceramic substrate and heat resistant transparent plastic substrate.

To examine the process of the Ag particles formation, a test sample having a volume ratio (Vag) of 0.25 was analyzed with a JAMP-30 type Auger Electron Spectrometer of Nihon Denshi Co., Tokyo, Japan. to determine the Ag distribution from the surface of the precursory or mixture layer toward the transparent substrate. As a result, it was found that the Ag distribution (concentration) was almost uniform in the precursory layer prior to the heating and was at its maximum at the surface of the mixture layer after the heating. In fact, the Ag concentration in the mixture layer was in the descending order in the direction along its depth toward the transparent substrate. The test sample prior to the heating had a specific resistance that was 100 times or more that of Ag. Thus, as mentioned hereinabove, it is assumed that the Ag in the mixture layer is not distributed continuously due to an obstacle of the three-dimensional structure of the metal nitride, but exists in the form of clusters. Furthermore, it is assumed that the Ag in the form of clusters diffuse upward through void spaces of the three-dimensional structure of the metal nitride, thereby forming the Ag particles on the mixture layer. By this diffusion, the spaces occupied by the Ag clusters turn into void spaces in the mixture layer. With this, the mixture layer has a porous structure. The ratio of the total volume of such void spaces of the mixture layer to the total volume of the mixture layer may be from 0.01 to 0.5.

The following test was conducted for examining the formation of the precursory Ag particles originating from the Ag continuous layer. In this test, the inventors studied the relationship between the energy added to the Ag continuous layer and the topographical change of the Ag continuous layer. At first, Ag continuous layers (thickness: 17 nm) were formed on float glass surfaces. Then, the coated glasses were heated for 2 minutes at 200° C., 250° C., 300° C., 350° C., and 400° C., respectively. Then, the coated film surface was observed with FE-SEM, S-4500 (trade name) of Hitachi Ltd, Tokyo, Japan. As a result, it was found that the Ag continuous layer turned into a network structure of Ag by the heating at 200° C., that it turned into Ag strings each having Ag particles of 7–10 in number by the heating at 250° C., that it turned into Ag strings each having Ag particles of 3–5 in number by the heating at 300° C. that it turned into Ag strings each having Ag particles of 2–3 in number by the heating at 350° C., and that it turned mainly into Ag particles separately distributed by the heating at 400° C. This result shows that the Ag continuous layer turns into a network structure, then into a string of Ag particles, and then into Ag particles separately distributed by increasing the energy added to the Ag continuous layer. It was found that a frequency selective film having a resonance wavelength range of 600–1,500 nm (particularly 800–1,500 nm) could be obtained by forming Ag particles through heating the Ag continuous layer with a smaller energy, as compared with the case in which Ag particles are formed through heating the precursory layer containing a mixture of a metal nitride and Ag.

The inventors studied the control of the average particle size of the Ag particles, as follows. A first test was conducted by forming a precursory layer (containing a metal nitride and Ag) on a float glass plate, then by forming an AlN layer (thickness: 10 nm) on the precursory layer, and then by heating the coated glass plate. This heating, however, did not form Ag particles on the AlN layer. Separately, a second test was conducted in the same manner as that of the first test, except that a small amount of Ag was added to the AlN layer prior to the heating. With this, it was found that a very small number of Ag particles having a large particle size were formed on the AlN layer after the heating. It is assumed from the results of the second test that the number of paths through which Ag diffuses by the heating becomes smaller if a precursory layer is prepared with a smaller amount of Ag, that the number of the resulting precursory Ag particles also becomes smaller, and that the particle size of the resulting Ag particles becomes larger. Therefore, it may be possible to control the particle size of the Ag particles by adjusting the amount of Ag used for preparing the precursory layer. It is further assumed that the Ag continuous layer turns into numerous precursory Ag particles (particle size: 50–200 nm) in the initial stage of the heating, and then the precursory Ag particles grow into the Ag particles while they unite with the Ag clusters (aggregates of Ag atoms) that have diffused from the precursory layer during the subsequent heating.

The following nonlimitative Examples are illustrative of the present invention.

EXAMPLE 1

A frequency selective plate having radio wave transparent property according to the present invention was prepared by the following procedures.

A washed float glass plate (thickness: 3 mm) was put into a DC magnetron sputtering apparatus, and its chamber was evacuated to have a vacuum of from $2 \times 10^{-4}$ Pa to $4 \times 10^{-4}$ Pa. In sputtering, the target-substrate distance was kept at 90 mm.

Four Ag chips (each being in the form of a rectangular parallelepiped having dimensions of 10 mm×10 mm×1 mm) were equidistantly disposed in an erosion region of a pure Al target (diameter: 152 mm; thickness: 5 mm). A reactive sputtering was conducted by applying a direct current of 200W to the Al target to make discharge. With this, a precursory layer (thickness: 200 nm) of a mixture of AlN and Ag was formed on the glass plate. A rectangular pulse wave with a frequency of 10 kHz was supplied to the cathode in order to prevent irregular discharge. During sputtering, the flow rate ratio $N_2/Ar$ was adjusted to 20/7, and the pressure of this mixed gas was controlled at 1 Pa.

The resulting coated glass plate was heated for 5 minutes in a muffle furnace having an atmospheric temperature of 500° C., thereby producing the target frequency selective plate having a mixture layer of AlN and Ag and Ag particles formed on the mixture layer.

Reflectance of the obtained frequency selective plate was measured in a wavelength range of 300–2,500 nm using a U-4000 type automated spectrophotometer of Hitachi Ltd., Tokyo, Japan. With this, the reflectance was at the maximum at 900 nm. The shielding effect (Es) in near infrared region was determined by putting the measured values in the expression (1). The result was 0.57. This means that the product was highly frequency selective.

The surface morphology of the Ag particles of the obtained frequency selective plate was observed with an FE-SEM (S-4500 (trade name) of Hitachi Ltd.) in a direction along normal line of the frequency selective plate. An image processing was conducted in a manner as explained above. The results were respectively 0.51 and 243 nm in Ag areal ratio and average particle size of the Ag particles. This Ag areal ratio is a ratio of the total area occupied by the Ag particles to the total area of the mixture layer in a plan view of the frequency selective plate. The Ag and Al contents of the precursory layer before the heating were respectively determined by an atomic absorption method. The measured values were put into the expression (2), and the obtained volume ratio (Vag) was 0.35.

EXAMPLE 2

Example 1 was repeated except in that each of the four Ag chips was in the form of a rectangular parallelepiped having dimensions of 8.7 mm×8.7 mm×1 mm, thereby obtaining a frequency selective plate.

The results of the evaluation tests of the frequency selective plate were as follows. The reflectance was at the maximum at 690 nm. The shielding effect (Es) in near infrared region was 0.40. The Ag areal ratio was 0.51, and the average particle size of the Ag particles was 206 nm. The volume ratio (Vag) was 0.25.

EXAMPLE 3

A precursory layer of a mixture of AlN and Ag was formed on a glass plate in the same manner as that of Example 1. The resulting precursory layer was irradiated with a YAG laser to conduct a heat treatment thereon, thereby obtaining a frequency selective plate with Ag particles having a substantially uniform particle size and a substantially complete round shape when viewed in a direction along normal line of the frequency selective plate.

Evaluation tests of the frequency selective plate were conducted in the same manners as those of Example 1, and the results are as follows. The reflectance was at the maximum at 730 nm. The shielding effect (Es) in near infrared region was 0.51. The Ag areal ratio was 0.52, and the average particle size of the Ag particles was 274 nm.

In fact, the YAG laser irradiation was conducted by the following procedures. At first, the coated glass plate (having the precursory layer formed on the glass plate) was put on an X-Y table. The X-Y table was adjusted such that it moved during the laser irradiation in a reciprocating manner along its X-axis at a speed of 200 mm/s with a pitch of 10 mm along its Y-axis. The laser irradiation was conducted in a manner that a laser beam (wavelength: 1.06 $\mu$m) oscillated by a YAG laser (LAY-616C (trade name) of Toshiba, Tokyo, Japan) was expanded to have a width of about 10 mm with an optical system using a collimator and that the coated glass plate was irradiated with such laser beam in a direction along normal line of the coated glass plate.

COMPARATIVE EXAMPLE 1

Example 1 was slightly modified by changing the number of the Ag chips in the erosion region of the Al target, thereby forming on the glass plate a precursory layer having a volume ratio (Vag) of 0.6. The resulting coated glass plate was heated in a muffle furnace. The resulting heated product was found to be 0.03 in shielding effect (Es). It is assumed that such high volume ratio (0.6) caused a failure of the formation of the three-dimensional matrix of AlN during the heating treatment and that this failure interfered with the Ag diffusion during the heating treatment and the subsequent formation of the Ag particles.

EXAMPLE 4

A (first) precursory layer (thickness: 100 nm) of a mixture of AlN and Ag was formed on a glass plate in the same manner as that of Example 1.

Then, a second precursory layer (i.e., an Ag continuous layer having a thickness of 8 nm) was formed on the first precursory layer by applying a direct current of 30 W to the pure Ag target (diameter: 152 mm; thickness: 5 mm) to make discharge. During the sputtering, only $N_2$ gas was allowed to flow, and its pressure was controlled at 1 Pa.

The resulting coated glass plate was heated for 5 minutes in a thermostatic oven having an atmospheric temperature of 500° C. After that, the coated glass plate was taken out of the furnace and allowed to stand still to cool it down, thereby producing the target frequency selective plate having a mixture layer of AlN and Ag and Ag particles formed on the mixture layer.

Reflectance and transmittance of the obtained frequency selective plate were measured in a wavelength range of 300–2,500 nm using a U-4000 type automated spectrophotometer of Hitachi Ltd. The shielding effect (Es) in near infrared region was determined by putting the measured value in the expression (1). The results are shown in Table 1.

continuous layer (a second precursory layer) on a first precursory layer. Furthermore, it is understood from Table 1 that resonance wavelength can be controlled by adjusting the thickness of the Ag continuous layer if it is in a range of 600–1,500 nm.

EXAMPLE 7

A (first) precursory layer (thickness: 50 nm) of a mixture of AlN and Ag was formed on a glass plate in the same manner as that of Example 4. Then, a second precursory layer (thickness: 12 nm) of a mixture of AlN and Ag was formed on the first precursory layer by the same manner as that for forming the first precursory layer except in that each Ag chip was in the form of a rectangular parallelepiped having dimensions of 5 mm×5 mm×1 mm. In other words, each Ag chip for forming the second precursory layer had a sputtering effective area that was ¼ of the sputtering effective area of each Ag chip for forming the first precursory layer.

The resulting coated glass plate was heated and cooled down in the same manners as those of Example 4, thereby

TABLE 1

| | Ag Continuous Layer Thickness (nm) | Mixture Layer Thickness (nm) | Resonance Wavelength (nm) | Near Infrared Shielding Effect (Es) | Visible Light Transmittance (%) |
|---|---|---|---|---|---|
| Ex. 4 | 8 | 100 | 850 | 0.42 | 20 |
| Ex. 5 | 17 | 100 | 1,300 | 0.43 | 33 |
| Ex. 6 | 35 | 100 | 1,500 | 0.41 | 38 |
| Com. Ex. 2 | 40 | 0 | 1,350 | 0.15 | 35 |

EXAMPLE 5

Example 4 was repeated except that a second precursory layer (i.e., an Ag continuous layer having a thickness of 17 nm) was formed on the first precursory layer.

EXAMPLE 6

Example 4 was repeated except that a second precursory layer (i.e., an Ag continuous layer having a thickness of 35 nm) was formed on the first precursory layer.

Figure 2:
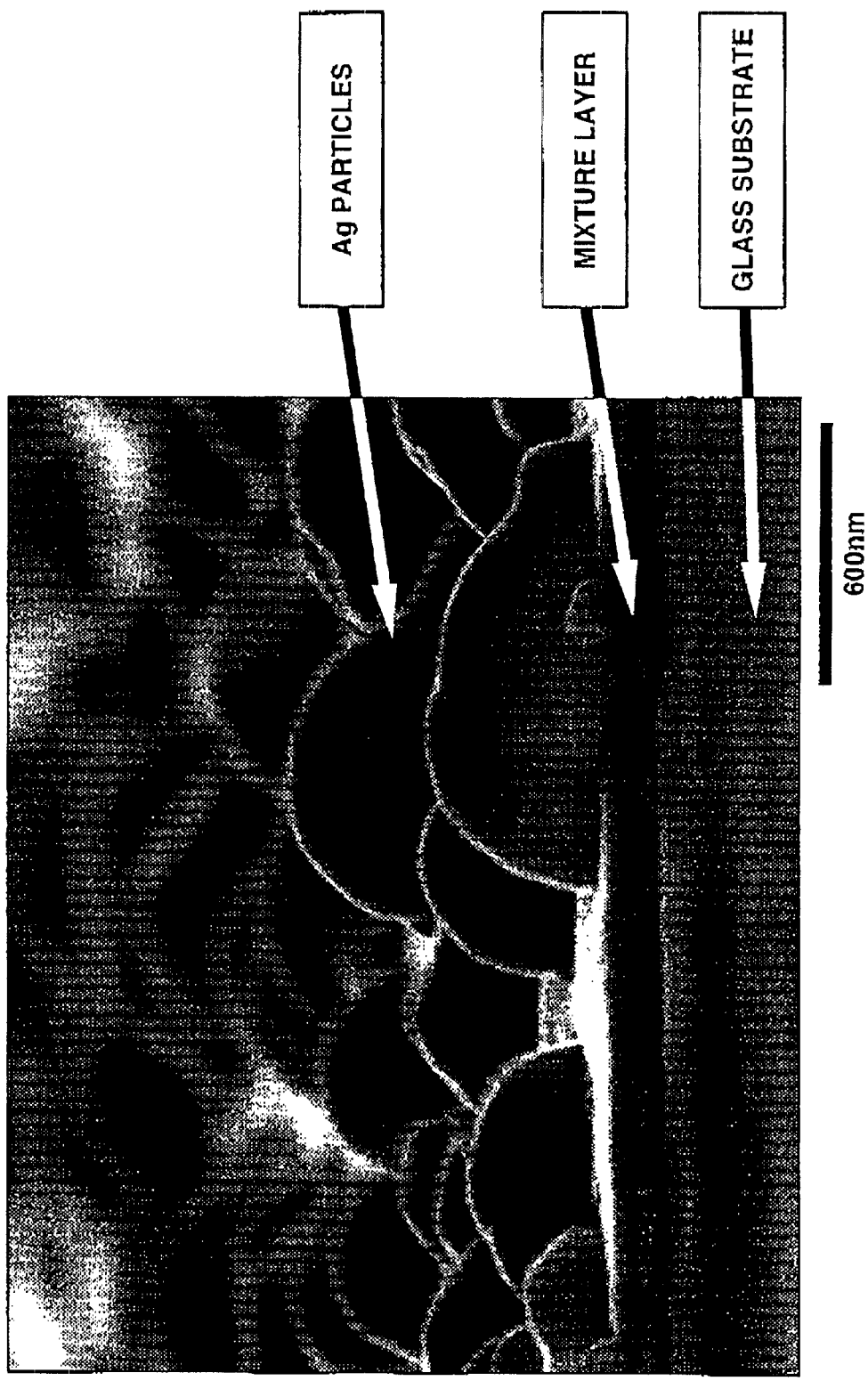
FIG. 2 is a photograph taken by SEM in a direction at 85 degrees to normal line of the frequency selective plate obtained in Example 6.

Furthermore, the obtained frequency selective plate was observed with an FE-SEM. In fact, FIG. 1 shows a photograph taken from above in a direction along normal line of the frequency selective plate, and FIG. 2 shows a photograph taken in a direction at 85 degrees to the normal line.

COMPARATIVE EXAMPLE 2

An Ag continuous layer having a thickness of 40 nm was directly formed on a glass plate in the same manner as that of Example 4. The resulting coated glass plate was subjected to the same procedures as those of Example 4, thereby producing a frequency selective plate. The frequency selective plate was subjected to the same evaluation tests, and the results are shown in Table 1.

It is possible to shift resonance wavelength, at which reflectance is at the maximum, into a range of 800–1,500 nm by increasing the thickness of the mixture layer. This, however, cannot produce a frequency selective plate with high visible light transmittance. In contrast, as shown in Examples 4–6, such shifting of resonance wavelength and no decrease of visible light transmittance were possible by a frequency selective plate prepared by forming an Ag producing the target frequency selective plate having (a) a first mixture layer of AlN and Ag (originating from the first precursory layer), (b) a second mixture layer of AlN and Ag (originating from the second precursory layer) formed on the first mixture layer, and (c) Ag particles formed on the second mixture layer.

The frequency selective plate was found to have the Ag particles, of which number was 0.6 times that of the Ag particles of Comparative Example 3, and of which average particle size was 1.3 times that of the Ag particles of Comparative Example 3, and to have a maximum reflectance that was 1.2 times that of the frequency selective plate of Comparative Example 3. In fact, the frequency selective plate was observed in a direction along normal line with an FE-SEM (S-4500 (trade name) of Hitachi Ltd.) to examine the surface morphology of the Ag particles, and then an image processing was conducted to determine the number of Ag particles and their average particle size per an area of 10 $\mu m^2$. The results are shown in Table 2.

TABLE 2

| | Second Precursory Layer Thickness (nm) | Ag Particles Number per 10 $\mu m^2$ | Average Particle Size of Ag Particles (nm) | Shielding Effect (Es) in Near-infrared Region | Maximum Reflectance (%) |
|---|---|---|---|---|---|
| Ex. 7 | 12 | 294 | 176 | 0.22 | 43 |
| Com. Ex. 3 | 0 | 494 | 133 | 0.19 | 35 |

COMPARATIVE EXAMPLE 3

Example 7 was repeated except in that the formation of the second precursory layer was omitted, thereby producing the target frequency selective plate having a mixture layer (thickness: 50 nm) of AlN and Ag and Ag particles formed on the mixture layer.

It is understood from Table 2 that the number of the Ag particles decreased and thereby their average particle size increased by forming the second precursory layer in Example 7, as compared with Comparative Example 3. Furthermore, it became clear from the observation with FE-SEM that the particle size distribution of the Ag particles became narrower in Example 7, as compared with that of Comparative Example 3. Consequently, as shown in Table 2, the maximum reflectance of Example 7 was greater than that of Comparative Example 3. It is assumed from the results of Table 2 that the diffusion of the Ag clusters from the first precursory layer toward the surface of the second precursory layer during the heating can be suppressed by a certain degree since the number of Ag diffusion paths formed by the heating in the second precursory layer is smaller than that of Ag diffusion paths formed by the heating in the first precursory layer.

The entire contents of each of Japanese Patent Application Nos. 2001-132236 (filed Apr. 27, 2001) and 2002-060205 (filed Mar. 6, 2002), of which priorities are claimed in the application, are incorporated herein by reference.

What is claimed is:

1. A frequency selective plate having a radio wave transparent property, said frequency selective plate comprising:
    a transparent substrate;
    a mixture layer formed on said transparent substrate, said mixture layer comprising a mixture of a metal nitride and Ag; and
    Ag particles formed on said mixture layer, said Ag particles being two-dimensionally distributed on said mixture layer and being separated from each other,
    wherein said mixture layer comprises (a) a three-dimensional skeleton a said metal nitride and (b) clusters of said Ag, said clusters are separately and three-dimensionally distributed in said three-dimensional skeleton of said metal nitride, and each cluster of said Ag is an aggregate of Ag atoms and has a size smaller than that of each Ag particle.

2. A frequency selective plate according to claim 1, wherein said mixture layer comprises a first region and a second region that is at a position closer to said transparent substrate than said first region is, an Ag concentration of said first region being higher than an Ag concentration of said second region.

3. A frequency selective plate according to claim 1, wherein said Ag particles have an average particle size of from 100 nm to 0.5 mm, and wherein a ratio of a total area occupied by said Ag particles to a total area of said mixture layer is from 0.2 to 0.8 in a plan view of said frequency selective plate.

4. A frequency selective plate according to claim 1, which has a maximum light ray reflectance in a wavelength range of from 600 mm to 1,500 nm.

5. A frequency selective plate according to claim 1, further comprising a dielectric layer disposed between said transparent substrate and said mixture layer.

6. A frequency selective plate according to claim 1, further comprising a dielectric layer formed on said mixture layer such that said Ag particles are embedded in said dielectric layer.

7. A frequency selective plate according to claim 1, wherein a shielding effect ($E_s$) of said frequency selective plate in a near infrared region is 0.3 or greater, said shielding effect being defined by the following expression (1), $$E_s = \frac{\sum_{\lambda=680}^{1800} [R_{dp}(\lambda) I_{sr}(\lambda)]}{\sum_{\lambda=680}^{1800} [I_{sr}(\lambda)]}, \tag{1}$$

where $\lambda$ is a wavelength of an electromagnetic wave incident on a coated side of said frequency selective plate, $R_{dp}(\lambda)$ is a reflectance of said coated side of said frequency selective plate at said $\lambda$, and $I_{sr}(\lambda)$ is an intensity of solar radiation at said $\lambda$ when an air-mass is 1.

8. A frequency selective plate according to claim 1, which has a visible light transmittance of 15% or greater.

9. A frequency selective plate having a radio wave transparent property, said frequency selective plate comprising:
    a transparent substrate;
    a first mixture layer formed on said transparent substrate, said first mixture layer comprising a mixture of a metal nitride and Ag;
    a second mixture layer formed on said first mixture layer, said second mixture layer comprising a mixture of a metal nitride and Ag; and
    Ag particles formed on said second mixture layer, said Ag particles being two-dimensionally distributed on said second mixture layer and being separated from each other.

10. A method for producing a frequency selective plate, said frequency selective plate comprising:
    a transparent substrate;
    a mixture layer formed on said transparent substrate, said mixture layer comprising a mixture of a metal nitride and Ag; and
    Ag particles formed on said mixture layer, said Ag particles being two-dimensionally distributed on said mixture layer and being separated from each other,
    wherein said mixture layer comprises (a) a three-dimensional skeleton of said metal nitride and (b) clusters of said Ag, said clusters are separately and three-dimensionally distributed in said three-dimensional skeleton of said metal nitride, and each cluster of said Ag is an aggregate of Ag atoms and has a size smaller than that of each Ag particle, said method comprising the steps of:
    (a) forming a precursory layer on said transparent substrate, said precursory layer comprising a precursory mixture of said metal nitride and said Ag; and
    (b) heating said precursory layer into said mixture layer such that said Ag particles, which originate from said Ag of said precursory layer, are formed on said mixture layer.

11. A method according to claim 10, wherein the step (b) is conducted by at least one selected from the group consisting of resistance heating, gas burning heating, laser beam irradiation, electron beam irradiation, and induction beating.

12. A method according to claim 10, wherein the step (a) is conducted by a sputtering.

* * * * *